United States Patent
Li

(10) Patent No.: US 6,466,312 B1
(45) Date of Patent: Oct. 15, 2002

(54) ILLUMINANCE SENSING HEAD STRUCTURE

(75) Inventor: Tung-Liang Li, Tainan (TW)

(73) Assignee: ST&T Instrument Corp., Tainan (TW)

( * ) Notice: Subject to any disclaimer, the term of this patent is extended or adjusted under 35 U.S.C. 154(b) by 0 days.

(21) Appl. No.: 09/900,994

(22) Filed: Jul. 9, 2001

(51) Int. Cl.⁷ .............................. G01J 1/42; F21V 9/00
(52) U.S. Cl. ........................ 356/218; 362/293; 362/355
(58) Field of Search ........................ 356/218, 213, 356/220, 226, 121; 362/293, 355; 257/98, 99; 250/458, 548

(56) References Cited

U.S. PATENT DOCUMENTS 4,003,660 A * 1/1977 Christie et al. ............. 250/226
4,825,078 A * 4/1989 Huber et al. ........... 250/370.15
5,477,057 A * 12/1995 Angeley et al. ............ 250/548

* cited by examiner

Primary Examiner—Karl D. Frech
Assistant Examiner—Edwyn Labaze
(74) Attorney, Agent, or Firm—Alan Kamrath; Rider, Bennett, Egan & Arundel, LLP

(57) ABSTRACT

The present invention relates to an illuminance sensing head structure including a housing, a light detector, a positioning member, a first color light filtering plate, a second color light filtering plate, and a diffusion plate. The housing has a top face recessed with a square plate receiving slot receiving the two color light filtering plates. The plate receiving slot has a center recessed with a rectangular receiving chamber for receiving the light detector. One side of the plate receiving slot is formed with a member receiving space for receiving the positioning member. The plate receiving slot has an outer edge provided with multiple rod insertion holes. The diffusion plate has an enclosure, and has a bottom formed with multiple insertion rods each close fit with the rod insertion hole.

2 Claims, 4 Drawing Sheets

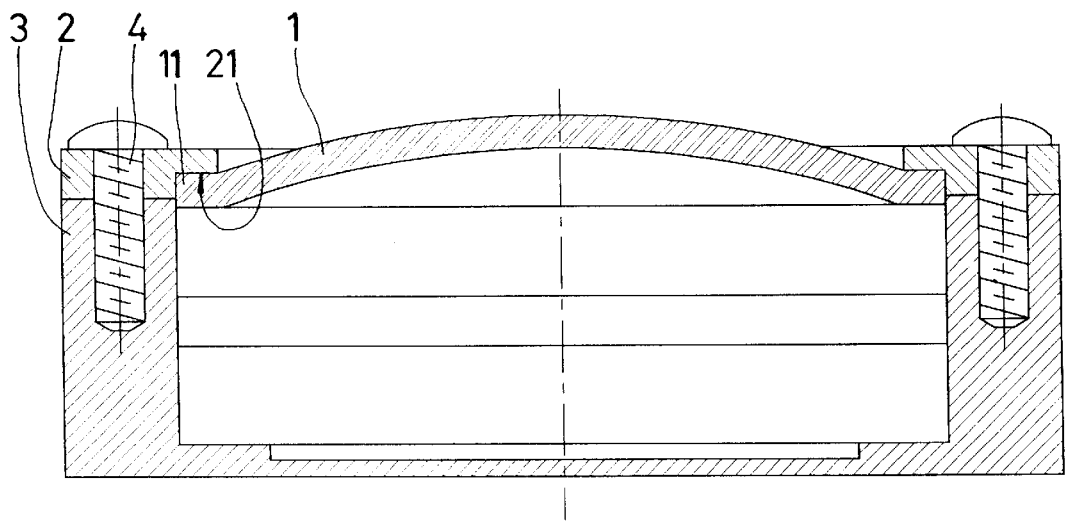
FIG.1(PRIOR)
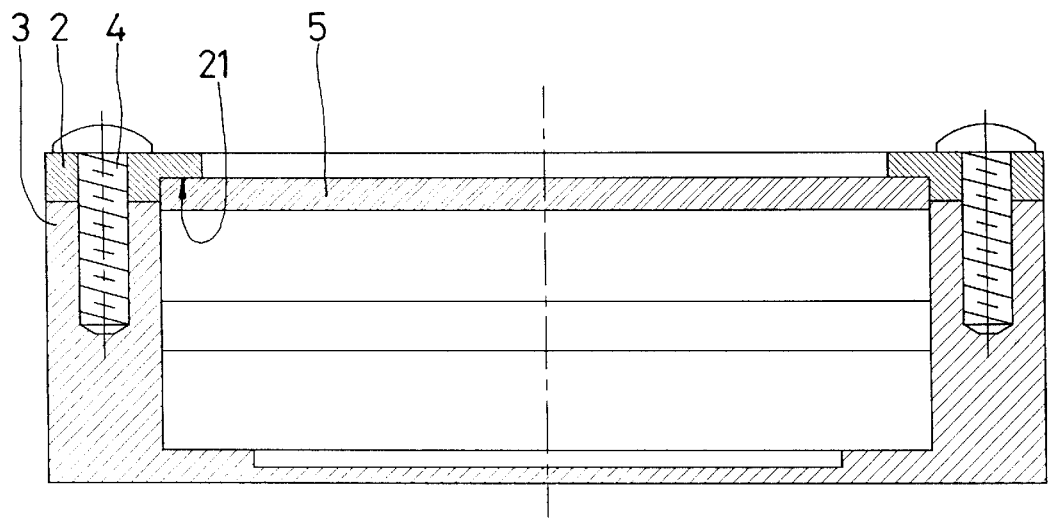
FIG.2(PRIOR)

ILLUMINANCE SENSING HEAD STRUCTURE

BACKGROUND OF THE INVENTION

1. Field of the Invention

The present invention relates to an illuminance sensing head structure, and more particularly to an illuminance sensing head structure that may correct the cosine effect of the optics.

2. Description of the Related Art

A first conventional illuminance sensing head in accordance with the prior art shown in FIG. 1 comprises a housing 3, a convex diffusion plate 1 mounted in the housing 3 and having an outer periphery provided with a positioning ring 11, a fixing plate 2 secured on the housing 3 by a screw member 4 and having an annular insertion groove 21 securing the positioning ring 11 of the diffusion plate 1. However, the periphery of the diffusion plate 1 is pressed by the fixing plate 2, so that it is unable to detect the effect of the side directed light, and so that the light source is not even, thereby limiting the cosine effect of the optics.

A second conventional illuminance sensing head in accordance with the prior art shown in FIG. 2 comprises a housing 3, a flat diffusion plate 5 mounted in the housing 3, a fixing plate 2 secured on the housing 3 by a screw member 4 and having an annular insertion groove 21 securing the periphery of the diffusion plate 5. However, the flat diffusion plate 5 is stopped by the thickness of the fixing plate 2, so that the amount of the incident light is not enough, and so that the light source is not even, thereby limiting the cosine effect of the optics.

SUMMARY OF THE INVENTION

The present invention has arisen to mitigate and/or obviate the disadvantage of the conventional illuminance sensing head.

The primary objective of the present invention is to provide an illuminance sensing head structure which includes a diffusion plate provided with an enclosure, thereby efficiently correcting the cosine effect of the optics, and thereby enhancing the testing precision of simulating human eyes to detect the illuminance intensity.

In accordance with the present invention, there is provided an illuminance sensing head structure, comprising a housing, a light detector, a positioning member, a first color light filtering plate, a second color light filtering plate, and a diffusion plate;

wherein, the housing is integrally formed by black opaque plastic material, and has a top face recessed with a square plate receiving slot for receiving the first color light filtering plate and the second color light filtering plate, the plate receiving slot has a center recessed with a rectangular receiving chamber which is formed with an oblique side, for receiving the light detector which has an oblique side, one side of the plate receiving slot has a mediate section formed with a member receiving space, for receiving the positioning member;

wherein, the plate receiving slot of the housing has an outer edge provided with multiple rod insertion holes;

the diffusion plate is a plate having a high diffusivity, and has an enclosure, the diffusion plate has a bottom formed with multiple insertion rods each inserted and secured into the rod insertion hole of the housing, each insertion rod has a rod diameter close fit in the hole diameter of each rod insertion hole.

Further benefits and advantages of the present invention will become apparent after a careful reading of the detailed description with appropriate reference to the accompanying drawings.

BRIEF DESCRIPTION OF THE DRAWINGS

FIG. 1 is a cross-sectional view of a first conventional illuminance sensing head in accordance with the prior art;

FIG. 2 is a cross-sectional view of a second conventional illuminance sensing head in accordance with the prior art;

DETAILED DESCRIPTION OF THE INVENTION

Figure 3:
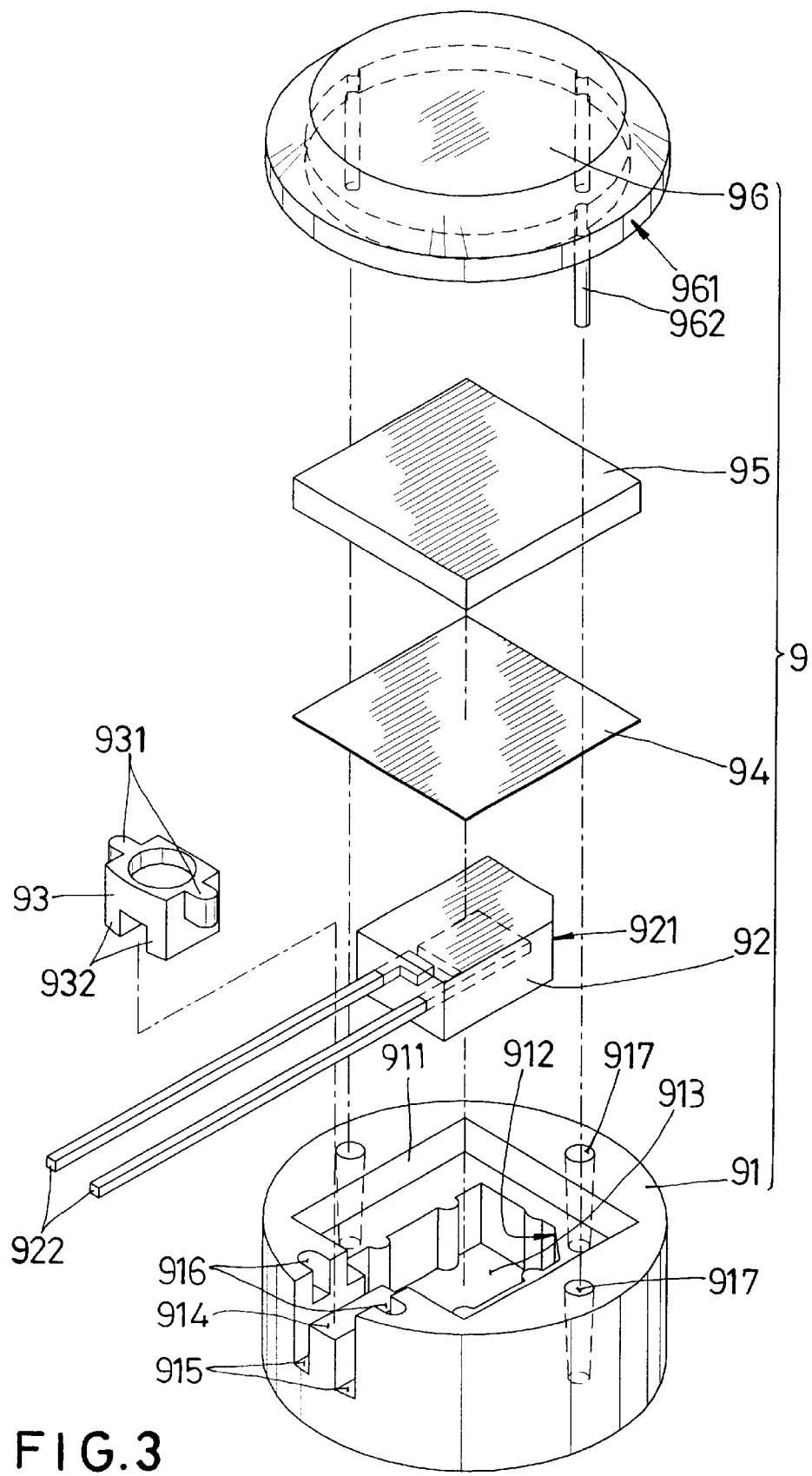
FIG. 3 is an exploded perspective view of an illuminance sensing head structure in accordance with the present invention.
Figure 4:
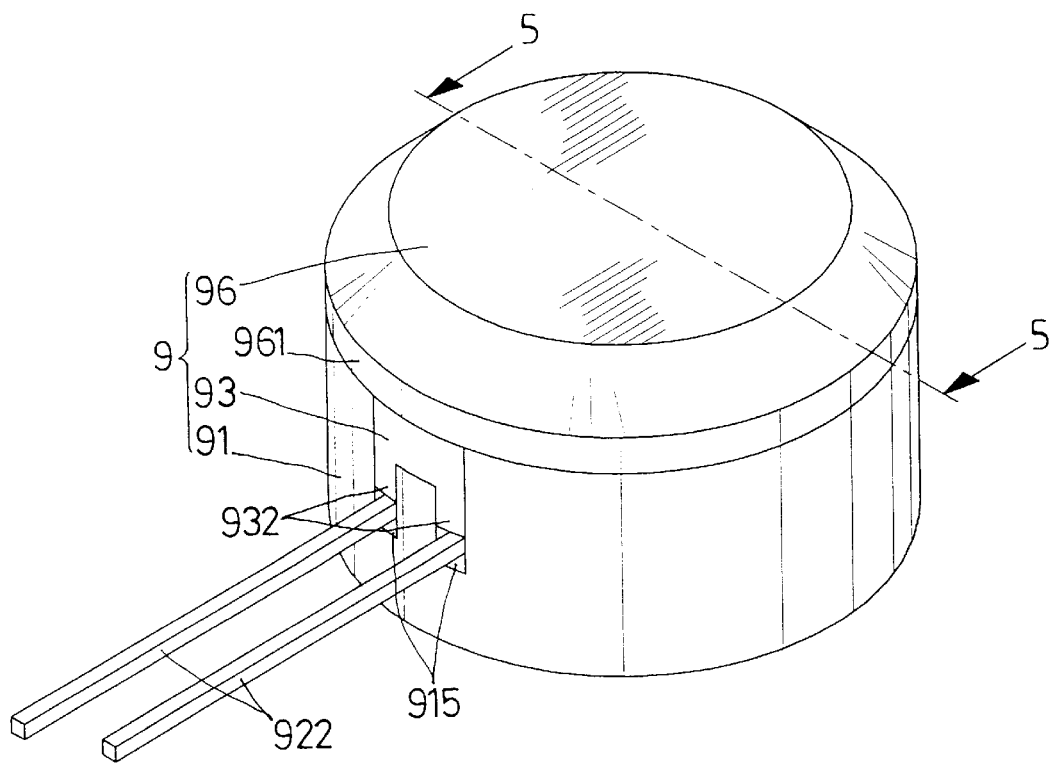
FIG. 4 is a perspective assembly view of an illuminance sensing head structure in accordance with the present invention.
Figure 5:
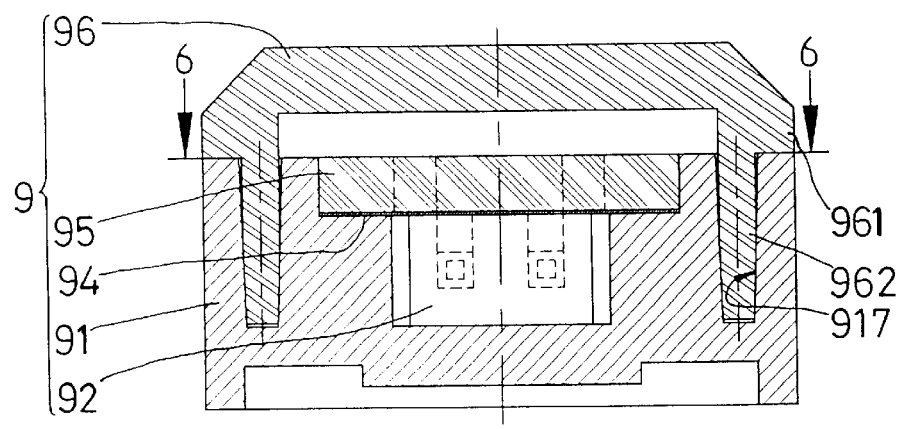
FIG. 5 is a cross-sectional view of the illuminance sensing head structure along line 5—5 as shown in FIG. 4.
Figure 6:
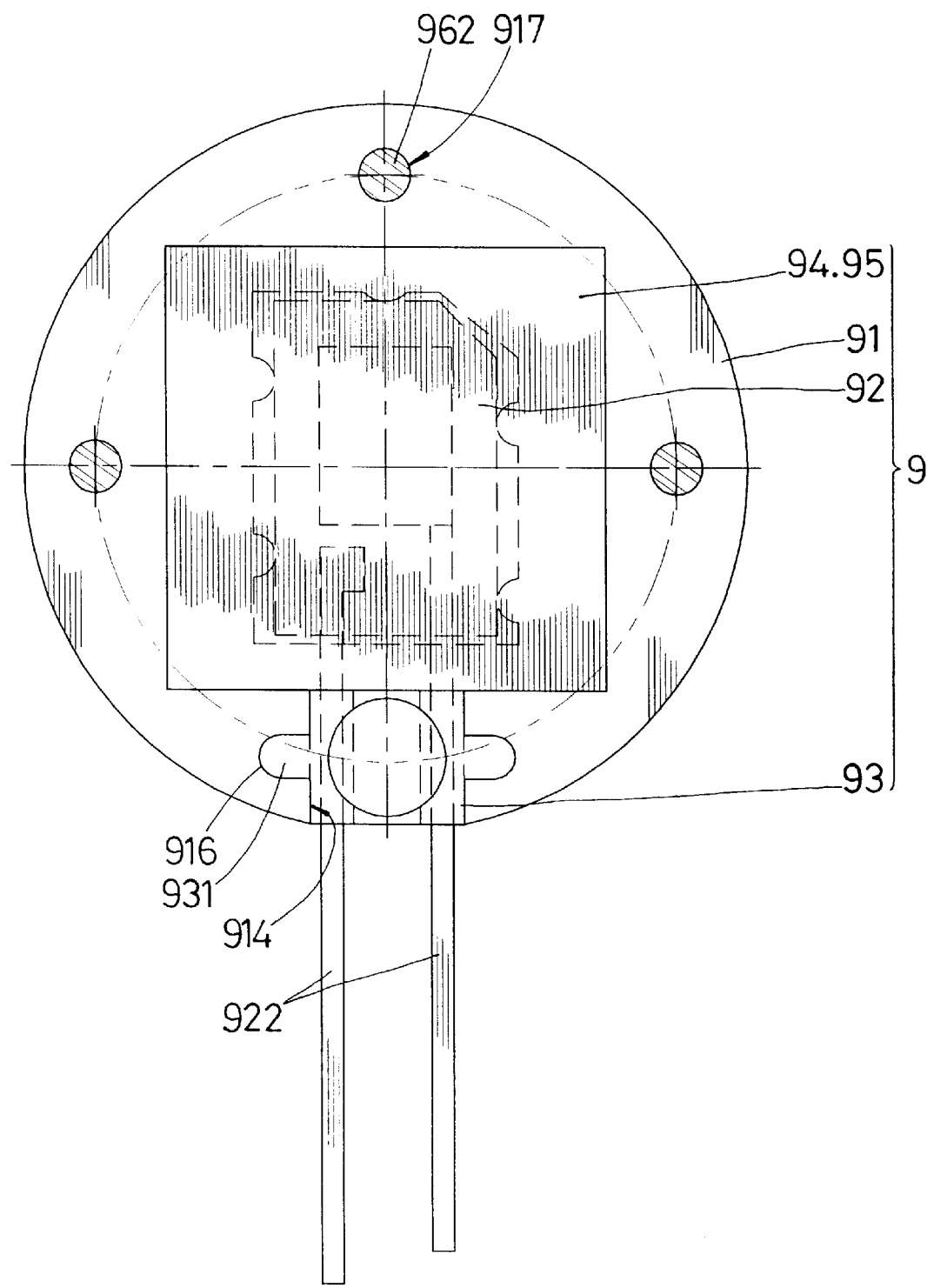
FIG. 6 is a cross-sectional view of the illuminance sensing head structure along line 6—6 as shown in FIG. 5.

Referring initially to FIGS. 3 and 4, an illuminance sensing head structure 9 in accordance with the present invention comprises a housing 91, a light detector 92, a positioning member 93, a first color light filtering plate 94, a second color light filtering plate 95, and a diffusion plate 96.

The housing 91 is integrally formed by black opaque plastic material, and has a top face recessed with a square plate receiving slot 911 which has a center recessed with a rectangular receiving chamber 913 which is formed with an oblique side 912. One side of the plate receiving slot 911 has a mediate section formed with a member receiving space 914. A U-shaped leg passing channel 915 is formed on a bottom of the member receiving space 914, and is communicated with the receiving chamber 913. The member receiving space 914 has two side walls each recessed with a lug insertion recess 916. The other three sides of the plate receiving slot 911 each have a mediate section having an outer edge respectively formed with a rod insertion hole 917 having an oblique wall.

The light detector 92 may be used to sense the spectrum to detect the intensity of the illuminance, and is formed with an oblique side 921 to rest the oblique side 912 of the receiving chamber 913 of the housing 91. The light detector 92 has two output end legs 922 each passing through the leg passing channel 915 of the housing 91.

The positioning member 93 is inserted into the member receiving space 914 of the housing 91, and has two side walls each formed with a side lug 931 that may be inserted into the lug insertion recess 916 of the housing 91. The positioning member 93 has a bottom formed with two spaced leg press plates 932 inserted into the leg passing channel 915 of the housing 91 to press the output end leg 922 of the light detector 92.

The first color light filtering plate 94 is a yellow-colored plate that is inserted into the plate receiving slot 911 of the housing 91.

The second color light filtering plate 95 is a blue-colored plate that is inserted into the plate receiving slot 911 of the housing 91 to overlap the first color light filtering plate 94.

The diffusion plate 96 is a plate having a high diffusivity, and has an enclosure 961. The diffusion plate 96 has a bottom formed with three insertion rods 962 each inserted and secured into the rod insertion hole 917 of the housing 91. Each insertion rod 962 has a rod diameter close fit in the hole diameter of each rod insertion hole 917.

In assembly, referring to FIGS. 3–6, the light detector 92 is inserted into the receiving chamber 913 of the housing 91, with the two output end legs 922 protruding outward from the leg passing channels 915 of the housing 91. The positioning member 93 is then inserted into the member receiving space 914 of the housing 91. Each side lug 931 of the positioning member 93 is inserted into the lug insertion recess 916 of the housing 91, while each leg press plate 932 of the positioning member 93 is inserted into the leg passing channel 915 of the housing 91 to press the output end leg 922 of the light detector 92, so that the light detector 92 may be positioned in the housing 91 by the positioning member 93. Then, the first color light filtering plate 94 and the second color light filtering plate 95 are in turn inserted into the plate receiving slot 911 of the housing 91. Then, each insertion rod 962 of the diffusion plate 96 is inserted and secured into the rod insertion hole 917 of the housing 91, thereby completing the assembly of the illuminance sensing head structure 9 in accordance with the present invention.

Accordingly, the illuminance sensing head structure in accordance with the present invention has the following advantages.

1. The diffusion plate 96 is provided with an enclosure 961, thereby efficiently correcting the cosine effect of the optics, and thereby enhancing the testing precision of simulating human eyes to detect the illuminance intensity.
2. When the wavelength is ranged between 540 nm and 780 nm, the first color light filtering plate 94 and the second color light filtering plate 95 have the maximum light splitting permeability. When the wavelength is ranged between 380 nm and 470 nm, the color light filtering plate of the impermeable ultraviolet region may mate with the wavelength ranged between 380 nm and 555 nm to have a maximum light splitting permeability. When the wavelength is ranged between 700 nm and 780 nm, the color light filtering plate of the impermeable infrared region may correct the detector that does not satisfy the viewing effect function to satisfy the functional standard.
3. The insertion rod 962 of the diffusion plate 96 is close fit with the rod insertion hole 917 of the housing 91, so that the diffusion plate 96 may be combined with the housing 91 rigidly.
4. The diffusion plate 96 may be easily combined with the housing 91 without aid of any tool.
5. The light detector 92 may be positioned in the housing 91 by the positioning member 93 which can also prevent the diffusion light from entering the housing 91 through the member receiving space 914.
6. The diffusion plate 96 may function a medium to distribute the light, so that the light can be distributed evenly. In addition, the diffusion plate 96 may also fix the first color light filtering plate 94 and the second color light filtering plate 95.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An illuminance sensing head structure, comprising a housing, a light detector, a positioning member, a first color light filtering plate, a second color light filtering plate, and a diffusion plate;

wherein, the housing is integrally formed by black opaque plastic material, and has a top face recessed with a square plate receiving slot for receiving the first color light filtering plate and the second color light filtering plate, the plate receiving slot has a center recessed with a rectangular receiving chamber which is formed with an oblique side, for receiving the light detector which has an oblique side, one side of the plate receiving slot has a mediate section formed with a member receiving space, for receiving the positioning member;

wherein, the plate receiving slot of the housing has an outer edge provided with multiple rod insertion holes;

the diffusion plate is a plate having a high diffusivity, and has an enclosure, the diffusion plate has a bottom formed with multiple insertion rods each inserted and secured into the rod insertion hole of the housing, each insertion rod has a rod diameter close fit in the hole diameter of each rod insertion hole.

2. The illuminance sensing head structure in accordance with claim 1, wherein the rod insertion holes are defined in an inner end face of the housing in an equally spaced manner.

* * * * *